United States Patent
Sobin et al.

(10) Patent No.: US 11,604,107 B2
(45) Date of Patent: Mar. 14, 2023

(54) LOAD CELL SYSTEM FOR PUMPJACK AND METHOD OF INSTALLING LOAD CELL

(71) Applicant: Schneider Electric Systems USA, Inc., Foxborough, MA (US)

(72) Inventors: Zackery Sobin, Raleigh, NC (US); James Redmond, Richmond (CA); Scott Guimond, Gatineau (CA)

(73) Assignee: Schneider Electric Systems USA, Inc., Foxboro, MA (US)

( * ) Notice: Subject to any disclaimer, the term of this patent is extended or adjusted under 35 U.S.C. 154(b) by 167 days.

(21) Appl. No.: 17/238,510

(22) Filed: Apr. 23, 2021

(65) Prior Publication Data

US 2021/0389197 A1 Dec. 16, 2021

Related U.S. Application Data

(60) Provisional application No. 63/038,471, filed on Jun. 12, 2020.

(51) Int. Cl.
*G01L 5/04* (2006.01)
*E21B 47/009* (2012.01)

(52) U.S. Cl.
CPC ............. *G01L 5/04* (2013.01); *E21B 47/009* (2020.05)

(58) Field of Classification Search
CPC ........ G01L 5/04; G01L 5/0061; E21B 47/009
See application file for complete search history.

(56) References Cited

U.S. PATENT DOCUMENTS

| 3,023,615 | A | | 3/1962 | Bennett | |
|---|---|---|---|---|---|
| 4,363,605 | A | | 12/1982 | Mills | |
| 5,182,946 | A | * | 2/1993 | Boughner | E21B 47/00 702/6 |
| 5,230,607 | A | * | 7/1993 | Mann | E21B 47/009 417/18 |
| 7,032,659 | B2 | * | 4/2006 | Barnes | F04B 47/026 417/18 |
| 7,513,752 | B2 | * | 4/2009 | Boone | E21B 47/009 73/152.01 |
| 8,793,080 | B1 | * | 7/2014 | Erlandsson | G01L 5/108 702/41 |
| 9,689,758 | B2 | * | 6/2017 | Zhao | G01L 1/22 |

(Continued)

*Primary Examiner* — Freddie Kirkland, III
(74) *Attorney, Agent, or Firm* — Stinson LLP (57) ABSTRACT

A load cell system for measuring rod load in a pumpjack. The system includes a tension load cell operatively coupled to a bridle between first and second bridle cables at a location longitudinally spaced between a horsehead and a bridle plate of the pumpjack. The bridle plate is coupled to the first bridle cable at a first connection point and the tension load cell is coupled to the first bridle cable at a second connection point longitudinally spaced between the bridle plate and the horsehead. The load cell system defines a third connection point longitudinally spaced between the second connection point and the horsehead. The load cell system is configured to maintain substantially constant longitudinal distances between the second connection point and each of the first and third connection points during operation of the horsehead. The load cell system is further configured to maintain a substantially constant lateral distance between the first and second bridle cables at the third connection point during operation of the horsehead.

20 Claims, 7 Drawing Sheets

(56) References Cited

U.S. PATENT DOCUMENTS

| | | | | |
|---|---|---|---|---|
| 9,952,073 B2* | 4/2018 | Zhao | ................ | E21B 47/009 |
| 9,983,076 B2* | 5/2018 | Zhao | ................ | F04B 17/006 |
| 2005/0089425 A1 | 4/2005 | Boone et al. | | |

* cited by examiner

LOAD CELL SYSTEM FOR PUMPJACK AND METHOD OF INSTALLING LOAD CELL

CROSS-REFERENCE TO RELATED APPLICATION

This application claims priority from U.S. Provisional Patent Application No. 63/038,471, filed Jun. 12, 2020, the entire disclosure of which is incorporated herein by reference.

FIELD

The present disclosure generally relates to a load cell system for a pumpjack rod string and more particularly to a load cell system that is capable of determining rod load by detecting the lateral tension imparted between two bridle cables of the rod string.

BACKGROUND

Pumpjacks utilize load cells to measure rod load. Measured rod load is used as an input to a rod pump controller that controls pump speed. Conventionally compression load cells are used to measure rod load. Such compression load cells typically have the form of a donut- or c-shaped puck that can be slidably received on the upper end portion of the polished rod. Compression load cells are situated on the polished rod between a bridle plate (also referred to as a hanger plate) and an upper rod clamp that is fixed onto the top end portion of the polished rod. As a result, compression forces between the upper rod clamp and the bridle plate corresponding to rod load are imparted directly on the load cell. Load cells can be wearable parts that require periodic replacement.

A known issue with the types of compressive load cells described above is that they require the upper rod clamp to be removed whenever the load cell is replaced. Removal of the upper rod clamp requires specialized equipment to support the rod string while the load cell is being replaced. The process of removing the upper rod clamp, replacing the load cell, and reinstalling the rod clamp, all while supporting the rod string using specialized equipment, can be dangerous and time-consuming, typically requiring at least two technicians and a minimum of two hours of downtime.

Accordingly, U.S. Pat. Nos. 3,023,615, and 4,363,605 and U.S. Patent Application Publication No. 2005/0089425 have proposed various forms of tension load cells in lieu of the compressive load cells described above. The tension load cells are installed between the two bridle cables of the pumpjack such that the tension load cell deflects one or both bridle cables laterally inward. The amount of tension imparted on the tension load cells between the two tables is related to rod load. However, conventional tension load cells of the type described in U.S. Pat. Nos. 3,023,615, and 4,363,605 and U.S. Patent Application Publication No. 2005/0089425 do not accurately measure rod load and thus have not gained wide industry acceptance.

SUMMARY

Aspects of the present invention permit accurate rod load measurements during operation of a pumpjack.

In an aspect, a load cell system for a pumpjack comprises a tension load cell and a strut. The tension load cell is fixed to a bridle of the pumpjack at a first longitudinal location along the bridle's length. The tension load cell has a first end portion connected to a first bridle cable and a second end portion connected to a second bridle cable and is configured to generate an output signal representative of a tension imparted on the tension load cell by the first and second bridle cables. The strut is fixed to the bridle at a second longitudinal location along the bridle's length spaced apart between the first longitudinal location and a horsehead of the pumpjack. The strut, which has a laterally extending width, is connected to the first bridle cable at a first lateral location along the width and connected to the second bridle cable at a second lateral location along the width. The first and second lateral locations are spaced apart from one another by a lateral spacing distance. In addition, the strut is configured to support the first and second bridle cables so that the first and second bridle cables at the second longitudinal location remain laterally spaced apart from one another by the lateral spacing distance during operation of the pumpjack.

In another aspect, a load cell system for measuring rod load in a pumpjack comprises a tension load cell operatively coupled to a bridle between first and second bridle cables thereof at a location longitudinally spaced between a horsehead and a bridle plate of the pumpjack. The bridle plate is coupled to the first bridle cable at a first connection point and the tension load cell is coupled to the first bridle cable at a second connection point longitudinally spaced between the bridle plate and the horsehead. The load cell system defines a third connection point with the first bridle cable, wherein the third connection point is longitudinally spaced between the second connection point and the horsehead. The load cell system is configured to maintain substantially constant longitudinal distances between the second connection point and each of the first and third connection points during operation of the horsehead. The load cell system is further configured to maintain a substantially constant lateral distance between the first and second bridle cables at the third connection point during operation of the horsehead.

In yet another aspect, a method of installing a load cell on a pumpjack includes operatively connecting a tension load cell to first and second bridle cables of a bridle of the pumpjack and connecting a strut to the first and second bridle cables. The tension load cell and the strut are located along a length of the bridle so that the strut is longitudinally spaced between the tension load cell and a horsehead of the pumpjack when the method is complete.

Other objects and features of the present invention will be in part apparent and in part pointed out herein.

DETAILED DESCRIPTION

Figure 1:
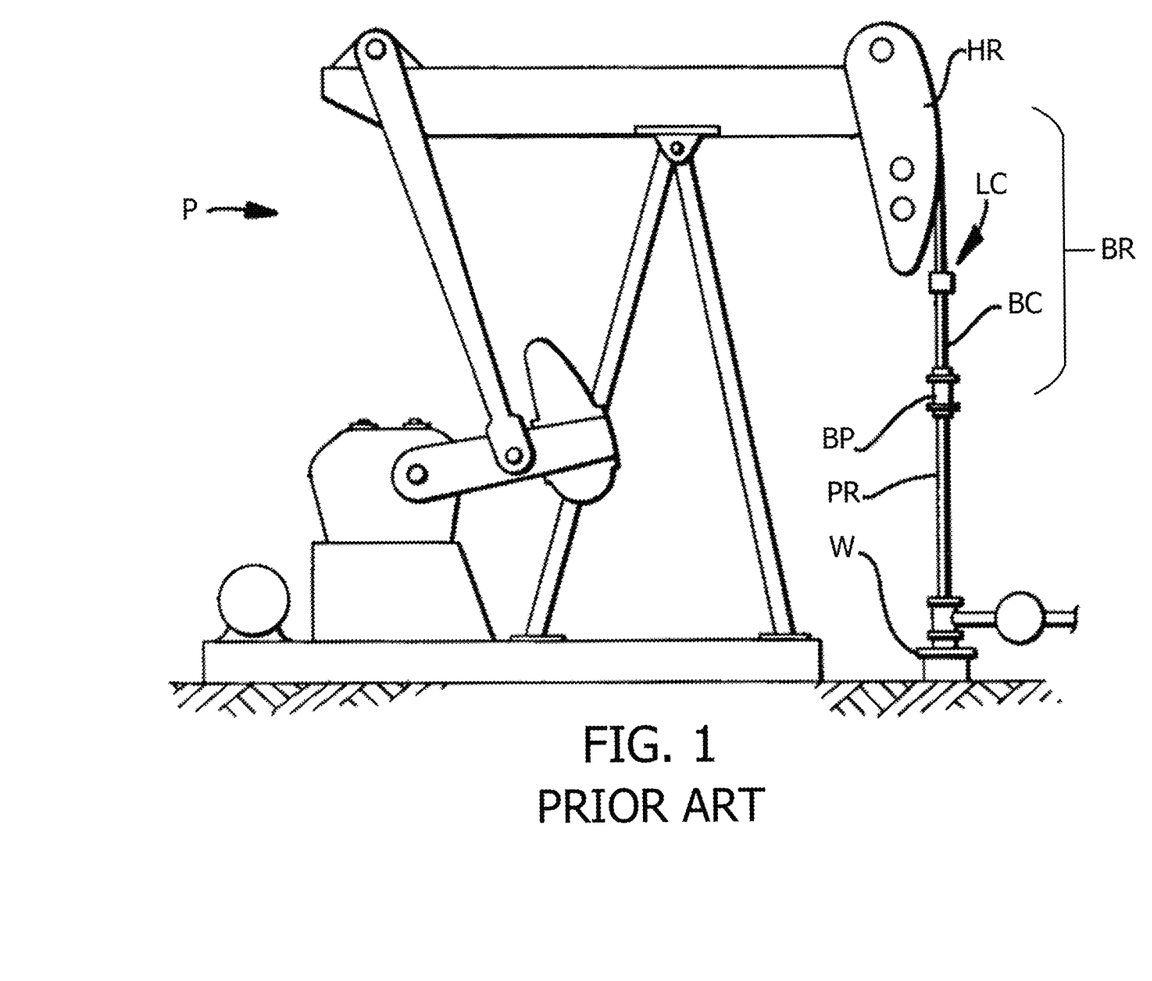
FIG. 1 is a schematic illustration of a side elevation of a pumpjack of the prior art.
Figure 2:
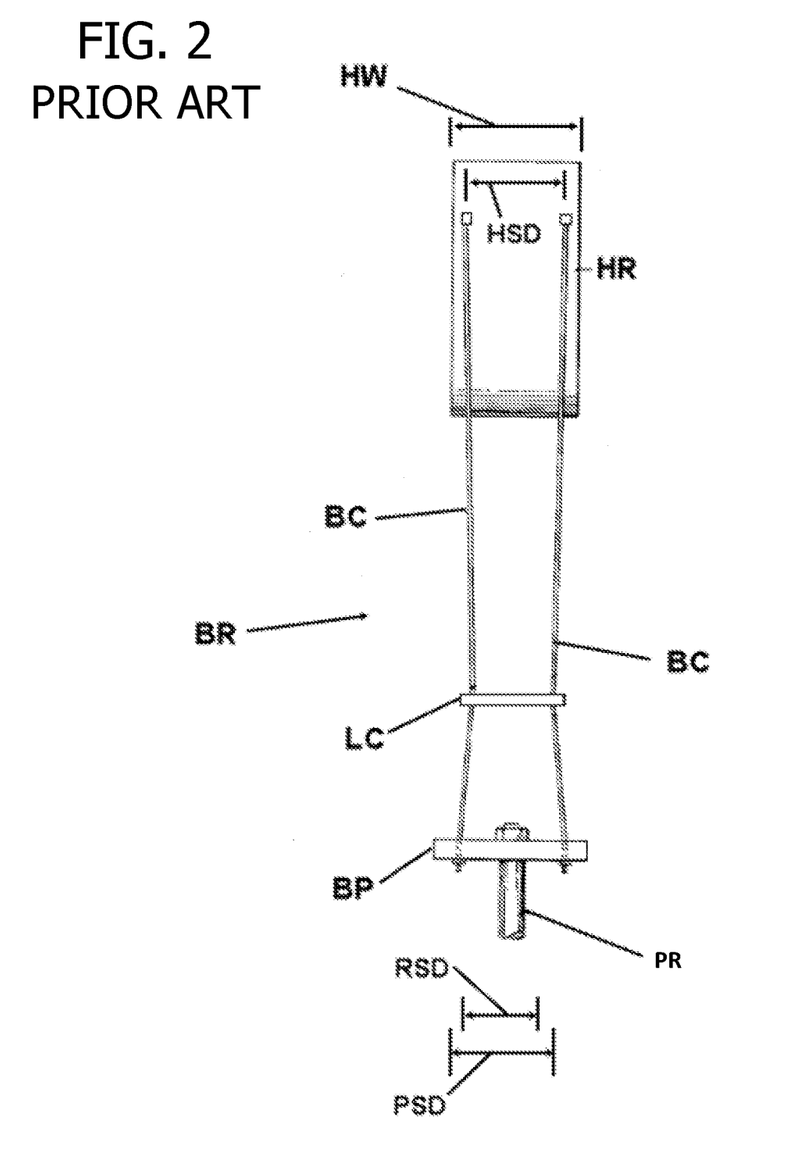
FIG. 2 is a schematic illustration of a front elevation of part of the pumpjack of FIG. 1.

Referring to FIGS. 1 and 2, an exemplary embodiment of a pumpjack equipped with a prior art tension load cell LC of the type disclosed in U.S. Pat. Nos. 3,023,615, and 4,363,605 and U.S. Patent Application Publication No. 2005/0089425 is generally indicated at P. The pumpjack P comprises a horsehead HR and a rod string, generally indicated at R. A proximal end portion of the rod string R is connected to the horsehead HR and a distal end portion of the rod string R (e.g., a sucker rod; not shown) is in operative relationship with a well W such that the pump jack P is capable of drawing fluid out of the well via the rod string in the conventional manner well-known to those skilled in the art. The rod string R comprises a bridle BR that defines the proximal end portion of the rod string and a polished rod extending downward from the bridle. The bridle BR includes a bridle plate BP and first and second bridle cables BC that extend longitudinally from the horsehead HR to the bridle plate in laterally spaced apart relationship with one another. The proximal end portions of the bridle cables BC are coupled to the horsehead HR such that the proximal end portions of the bridle cables are laterally spaced apart from one another by a horsehead spacing distance HSD (FIG. 2). In an embodiment, the horsehead spacing distance HSD is slightly less than a total width HW (FIG. 2) of the horsehead. The distal end portions of the bridle cables BC are coupled to the bridle plate BP such that the distal end portions of the bridle cables are laterally spaced apart from one another by a bridle plate spacing distance PSD (FIG. 2). In certain embodiments the bridle plate spacing distance PSD is about the same as the horsehead spacing distance HSD (e.g., the distances differ by less than 5% of the greater of the two distances).

A prior art tension load cell LC is shown coupled to the bridle cables BC at a first location spaced apart longitudinally along the bridle BR between the horsehead HR and the bridle plate BP. The tension load cell LC is shaped and arranged to hold the first and second bridle cables BC such that they are laterally spaced apart from one another by a reduced spacing distance RSD that is less than the horsehead spacing distance HSD and the bridle plate spacing distance PSD. As such, a load on the polished rod PR will urge the bridle cables BC laterally apart from one another at the tension load cell LC, thereby imparting tension on the tension load cell. The above-noted prior art references have theorized that this tension is proportional to rod load and thus can be measured and used as a proxy for rod load.

Figure 3:
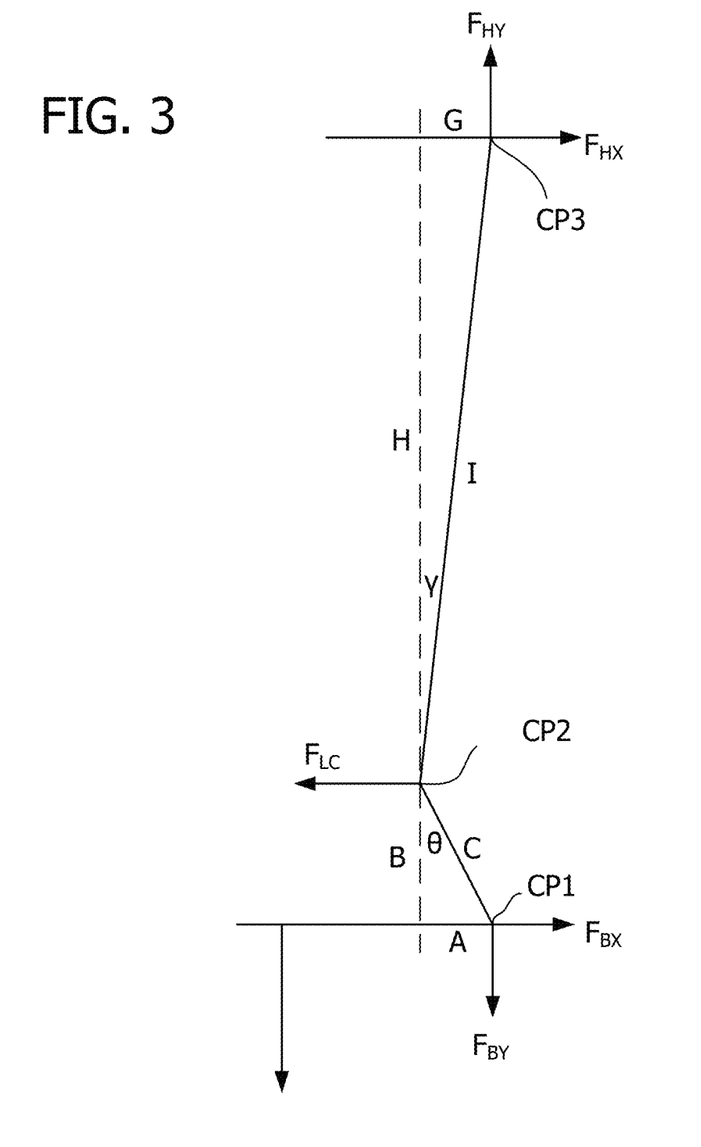
FIG. 3 is a schematic illustration of bridle cable geometry for calculating forces on a deflected bridle cable.

However, the present inventors have recognized that an accurate determination of rod load based on the tension imparted on a tension load cell LC requires an accurate characterization of the geometry of the bridle BR. In particular, referring to FIG. 3, which schematically depicts the geometry of one bridle cable BC, the inventors have recognized that a rod load $F_R$ can be accurately determined as a function of tension imparted on the load cell $F_{LC}$, if the following geometric parameters are known with respect to each deflected bridle cable BC: (i) a lateral distance A from a first connection point CP1 between the cable and the bridle plate BP to a second connection point CP2 between the cable and the tension load cell LC; (ii) a longitudinal distance B from the first connection point to the second connection point; (iii) a lateral distance G from the second connection point to a third connection point CP3 between the bridle cable and the horsehead HR (the location of this third connection point is described more fully below); and (iv) a longitudinal distance H from the second connection point to the third connection point. When these parameters are known, the component forces $F_{HX}$, $F_{HY}$, $F_{BX}$, $F_{BY}$ imparted on the bridle BR substantially adhere to the relationships defined in Equations 1-4 below:

$$\frac{B}{H+B} = \frac{F_{HX}}{F_{LC}} \qquad \text{Equation 1}$$

$$\frac{A}{B} = \frac{F_{HX}}{F_{BY}} \qquad \text{Equation 2}$$

$$\frac{G}{H} = \frac{F_{HX}}{F_{HY}} \qquad \text{Equation 3}$$

$$F_{BX} = F_{LC} - F_{HX} \qquad \text{Equation 4}$$

The inventors have further recognized that, using the conventional tension load cell LC described above, it is not possible to accurately determine rod load FR using these relationships because the geometry of the deflected bridle cable(s) BC is constantly changing during operation of the pumpjack P. In particular, the location of the third connection point CP3 is continuously changing during the stroke of the horsehead H. Moreover, the changes in the location of the third connection point CP3 are not entirely predictable.

When the tension load cells of the prior art are used, the third connection point CP3 is located at the uppermost point along the bridle cable BC where the bridle cable begins to separate from the curved surface of the horsehead. For instance, to identify the location of the third connection point CP3, starting at the proximal end portion of the bridle cable BC, where the bridle cable is fastened to the horsehead HR, one can move downward along the segment of the cable that is pulled tightly against the curved surface of the horsehead by the rod string R until reaching the point at which the cable begins to separate from the curved horsehead surface. This separation or departure point forms the third connection point CP3 for purposes of the relationships described by Equations 1-4.

Figure 4A:
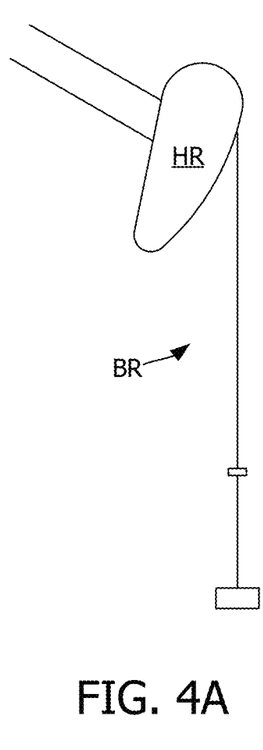
FIG. 4A is a schematic illustration of a side elevation of a horsehead and bridle of the pumpjack of FIG. 1, showing the horsehead at a lower end position.
Figure 4B:
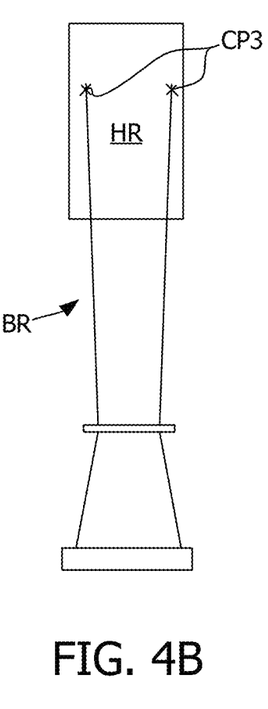
FIG. 4B is a schematic illustration of a front elevation of a horsehead and bridle of the pumpjack of FIG. 1, showing the horsehead at the lower end position of FIG. 4A.
Figure 5A:
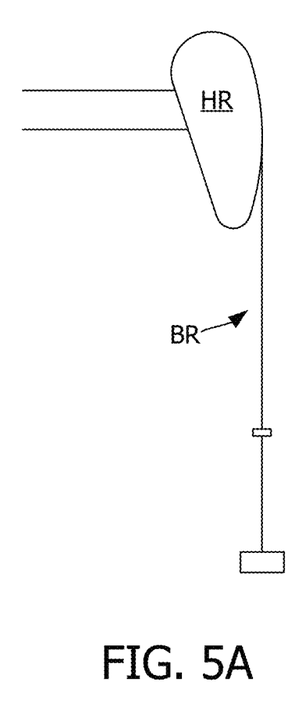
FIG. 5A is a schematic illustration of a side elevation of a horsehead and bridle of the pumpjack of FIG. 1, showing the horsehead at a middle position.
Figure 5B:
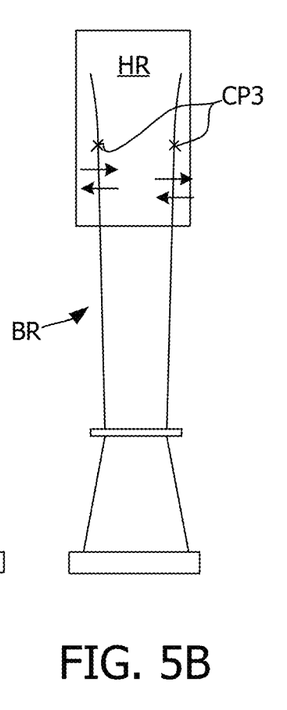
FIG. 5B is a schematic illustration of a front elevation of a horsehead and bridle of the pumpjack of FIG. 1, showing the horsehead at the middle position of FIG. 5A.
Figure 6A:
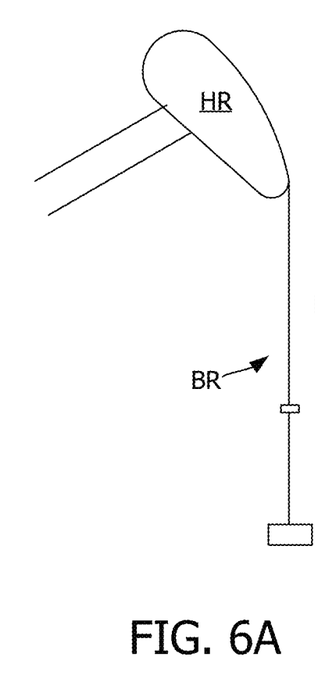
FIG. 6A is a schematic illustration of a side elevation of a horsehead and bridle of the pumpjack of FIG. 1, showing the horsehead at an upper end position.
Figure 6B:
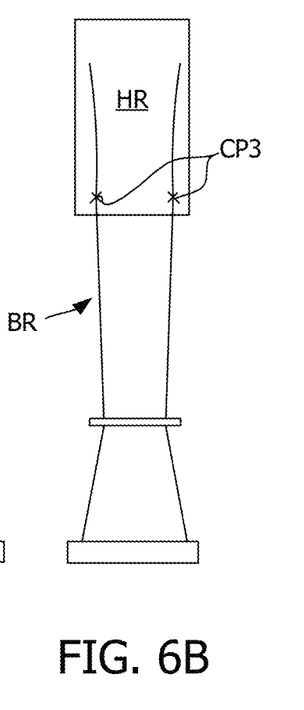
FIG. 6B is a schematic illustration of a front elevation of a horsehead and bridle of the pumpjack of FIG. 1, showing the horsehead at the upper end position of FIG. 6A.

Referring to FIGS. 4A and 4B, FIGS. 5A and 5B, and FIGS. 6A and 6B, it can be seen that the lateral and longitudinal location of the third connection point CP3 changes during the stroke of the pumpjack. FIGS. 4A and 4B represent the pumpjack P when the horsehead HR is in its lower position; FIGS. 5A and 5B represent the pumpjack P when the horsehead HR is in a middle position; and FIGS. 6A and 6B represent the pumpjack P when the horsehead HR is in its upper position. Comparing these figures, it can be seen that the location of the connection point CP3 changes along the range of motion of the horsehead HR. For example, lateral and longitudinal distances G and H (FIG. 3) are greatest at the lower position of the horsehead (FIGS. 4A and 4B) and least at the upper position of the horsehead (FIGS. 6A and 6B). Furthermore, as demonstrated by the schematic arrows in FIG. 5B, the bridle cables BC, in the prior art configuration of a tension load cell CL, can slide or shift laterally along the curved surface of the horsehead HR as the horsehead moves up and down. This creates unpredictable lateral variance in the location of the connection point CP3 during operation of the pumpjack P.

Accordingly, the present inventors have recognized that prior art tension load cells LC may be inaccurate because they do not maintain a bridle geometry that provides a consistent relationship between tension imparted on the load cell and the rod load. Referring to FIG. 10, the inventors have devised a load cell system, generally indicated at 110, that is believed to address these deficiencies of the prior art. Generally, the load cell system 110 comprises a tension load cell, generally indicated at 112, which is fixed to the bridle BR at a first longitudinal location along the length of the bridle, and a strut, generally indicated at 114, which is fixed to the bridle at a second longitudinal location along the length of the bridle. The second longitudinal location (where the strut 114 is located) is spaced apart along the length of the bridle BR between the first longitudinal location (where the tension load cell 114 is located) and the horsehead HR. As will be explained in further detail below, the strut 114 holds the form of the bridle BR so that the geometrically defined relationship between tension in the load cell 114 and rod load stays constant during pumpjack operation.

Figure 7:
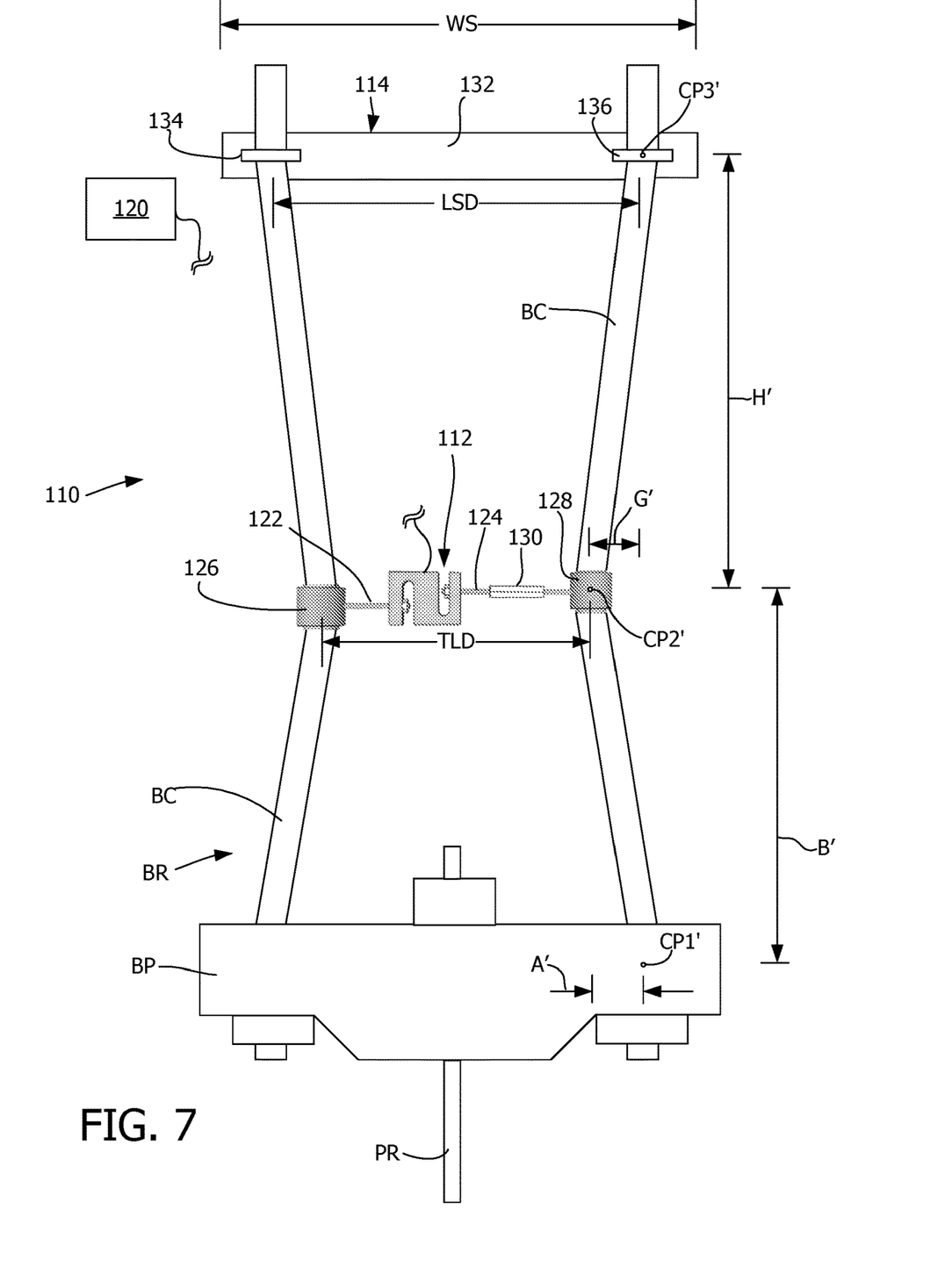
FIG. 7 is an elevation of the bridle equipped with a load cell system in the scope of this disclosure; and Corresponding parts are given corresponding reference numbers throughout the drawings.

Referring to FIG. 7, the tension load cell 112 has a left end portion (broadly, a first end portion) connected to the left bridle cable BC, as seen in FIG. 7, and a right end portion (broadly, a second end portion) connected to the left bridle cable. In the illustrated embodiment, the tension load cell comprises an S tension load cell oriented for detecting tension imparted on the tension load cell in the lateral direction by the first and second bridle cables BC. The illustrated tension load cell 112 is configured to generate an output signal representative of the tension imparted on the tension load cell by the first and second bridle cables to a measurement processor 120. The measurement processor is configured to receive the output signal and to determine a rod load based on the tension represented by the signal. Although an S-type tension load cell 112 is used in the illustrated embodiment, other types of tension load cells capable of outputting a signal representative of lateral tension imparted by the bridle cables BC may also be used without departing from the scope of the disclosure.

The tension load cell 112 is connected to the first and second bridle cables BC to hold the cables so that they are spaced apart by a tensioned lateral distance TLD at the first longitudinal location along the bridle BR. In the illustrated embodiment, the load cell system 110 comprises a first link 122 extending from the left end portion of the load cell 112 to the left bridle cable and second link 124 extending from the right end portion of the load cell to the right bridle cable. Any suitable link structure (e.g., a bar, a shaft, a wire, a cable, or the like) that is able to resist elongation in tension may be used for the first and second links 122, 124. In one or more embodiments, at least one of the first and second links 122, 124 comprises a tensioner 130 (e.g., a turnbuckle) configured to adjust the tensioned lateral distance TLD between the first and second bridle cables BC at the first longitudinal location.

In the illustrated embodiment, the load cell system 110 further comprises a first cable clamp 126 on the first link 122 and a second cable clamp 128 on the second link 124. The first and second cable clamps 126, 128 couple the first and second links 122, 124 to the respective bridle cables BC. Any suitable cable clamp structure for securely holding the links 122, 124 and the load cell 112 at the first longitudinal location may be used for the first and second cable clamps 126, 128. For example, in one or more embodiments each of the cable clamps 126, 128 comprises cushioned screwclamp such as a Zoro Select Cushioned Clamp, available from Zoro Tools, Inc. The load cell 112, the links 122, 124, and the cable clamps 126, 128 may be collectively referred to as a load cell assembly. It can be seen that the load cell assembly is configured to be mounted as a unit on the bridle BR at the first longitudinal location.

Referring further to FIG. 7, the strut 114 comprises a strut member 132 and first and second cable clamps 134, 136 configured to couple the strut member to the left and right bridle cables BC, respectively. In the illustrated embodiment, the strut member 132 is an elongate length of material that is resistant to lengthwise compression. In use the strut member extends longitudinally in the lateral direction and defines a width WS of the strut 114. Suitable strut members 132 can be formed from square or round tube stock, square or round bar stock, or other materials that can resist the compressive loads that are imparted on the strut 114 during use.

The first cable clamp 134 connects the left bridle cable BC to the strut member 132 at a first lateral location along the width WS of the strut 114, and the second cable clamp 136 connects the right bridle cable to the strut member at a second lateral location along the width of the strut. The first and second lateral locations are spaced apart from one another by a lateral spacing distance LSD that is greater than the tensioned lateral distance TLD between the bridle cables BC at the first longitudinal location along the length of the bridle BR. The strut 114 is generally configured to support the bridle cables BC so that, at the second longitudinal location along the bridle BR, they remain laterally spaced apart from one another by the lateral spacing distance LSD during operation of the pumpjack P. In one or more embodiments, the clamps 134, 136 are releasably securable to the strut member 132 at a plurality of spaced apart locations along the width WS of the strut 114 to selectively adjust the lateral spacing distance LSD. For example, in the illustrated embodiment, the strut member 132 can comprise a set of holes (not shown) formed in the strut member at spaced apart locations along the width WS of the strut 114 to mount the cable clamps at corresponding lateral locations. In the illustrated embodiment, the cable clamps 134, 136 comprise threaded U bolts configured to be tightened onto the strut member 132 so as to pinch the bridle cables between the strut member and the U bolts.

In one or more embodiments, the strut 114 is configured so that the lateral spacing distance LSD is about the same as the horsehead cable spacing distance HSD shown in FIG. 2 (e.g., the distances differ by less than 5% of the greater of the two distances). In certain embodiments, the lateral spacing distance LSD is in an inclusive range of from about 90% to about 100% of the total width HW of the horsehead HR. This allows the proximal end portions of the bridle cables BC to extend substantially parallel to the edges of the horsehead HR and minimizes the tendency of the bridle cables to shift laterally along the curved horsehead surface during use of the pumpjack P.

As can be seen, unlike the prior art tension load cell systems, the load cell system 110 fixes the geometry of the bridle BR between the strut 114 and the bridle plate BP. Referring to FIG. 7, once the tension load cell system 110 is installed, the following geometric parameters can be determined for each bridle cable BC and will not substantially change during use of the pumpjack P: (i) the lateral distance A' from a first connection point CP1' between the cable and the bridle plate BP to a second connection point CP2' between the cable and the tension load cell 112; (ii) a longitudinal distance B' from the first connection point to the second connection point; (iii) a lateral distance G' from the second connection point to a third connection point CP3' between the bridle cable and the strut; and (iv) a longitudinal distance H' from the second connection point to the third connection point. Thus, the measurement processor 120 can determine the rod load as a function of the tension imparted on the tension load cell 112 based on the established geometry of the bridle BR.

TABLE 1 below provides a series of mathematical equations that show the relationship between the tension imparted on the load cell 112 and the rod load when the geometry of the load cell system 110 is fixed as explained above with respect to FIG. 3:

distance LSD and less than the bridle spacing distance BSD. If not already properly configured, the measurement processor 120 is then programmed to determine rod load as a function of tension imparted on the tension load cell 112 by characterizing the geometry of the bridle BR (e.g., the distances A', B', G', H', LSD, and/or TLD are input to the measurement processor to configure the measurement processor for the established bridle geometry). Subsequently, the pumpjack motor can be switched on to resume pumping.

While the pumpjack is in operation, the tension load cell 112 generates an output signal representative of tension imparted on the load cell to the measurement processor 120, and the measurement processor uses the output signal to determine rod load. The determined rod load can be used (e.g., by the same or a different processor) to control the speed of the pumpjack motor. When the tension load cell becomes worn, a technician can simply remove the load cell 112 from the cable clamps 126, 128 (or remove the load cell

TABLE 1

| | | Step A. Calculation of Fbx (Bridle Horizontal Force) in Terms of Loadcell Force |
|---|---|---|
| 1 | $\tan(\theta) =$ Fbx/Fby | $\theta$ is the angle a cable assumes if one end is fixed and the other end is subject to Fbx horizontal force and Fby vertical force. |
| 2 | E = Fbx/Fby | Since with the exception of cable stretch, geometry of this system is constant, thus $\tan(\theta)$ is also a constant, referred to as E. |
| 3 | Fbx = Fby* E | Solving Equation 2 for Fbx. |
| 4 | Fbx = 0.5* Fr * E | Since the bridle is supported by 2 cables, each cable supports half its weight. Substitute ½ Rodstring force for Fby. |
| | | Step B. Calculate Loadcell Force in Terms of Fbx |
| 5 | Flc = Fbx + Fhx | Loadcell horizontal tension is the sum of bridle horizontal compression and horsehead horizontal compression (this equation compares their magnitudes). |
| 6 | $Flc = Fbx * \dfrac{H}{H+B}$ | The ratio of bridle compression to horsehead compression is proportional to the distance between either of them and the bridle. For example: 1. If the loadcell is vertically centered between bridle and horsehead, the bridle and horsehead equally share the horizontal load. 2. If the loadcell is positioned at the bridle, the bridle carries all the load. |
| | | Step C. Substitute results from Step B into Step A |
| 8 | $Flc = 0.5 * Fr * E * \dfrac{H}{H+B}$ | Substitute Equation 4 into Equation 6. |
| 9 | $Flc = Fr * 0.5 * E * \dfrac{H}{H+B}$ | Rearrange Equation 8 to put all the constants together. |
| 10 | $G = 0.5 * E * \dfrac{H}{H+B}$ | Since 0.5, E, H, and B are all constants, replace them all with another expression, constant G, shown here. |
| 11 | Flc = Fr * G | Substitute Equation 10 into Equation 9. For a given geometry, force on the loadcell is proportional to force on the rods. The relationship between the two is represented as a constant G. |

In addition to facilitating accurate measurement of rod load, the tension load cell system 110 is also capable of being installed on the pumpjack and replaced safely and quickly. To install a load cell system 110, the motor of the pumpjack P is turned off. Then a technician secures the tension load cell 112 to the bridle BR at the first longitudinal location using the cable clamps 126, 128. Additionally, the technician secures the strut 114 to the bridle using the cable clamps 134, 136. The strut cable clamps 134, 136 are suitably positioned along the width WS of the strut 114 to set a lateral spacing distance LSD that is about the same as the horsehead cable spacing distance HSD. In certain embodiments, the tensioner 130 is used to adjust the tensioned lateral distance TLD to be less than the lateral spacing and cable clamps together) and reinstall a new load cell 112 so that it is connected between the bridle cables BC at the first longitudinal location and so that the tensioned lateral distance TLD between the cables at the first longitudinal location remains the same as before. The rod clamp that secures the polished rod PR to the bridle BR is never removed during the processes of installing and replacing the load cell 112.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media, including memory storage devices.

Examples of computing systems, environments, and/or configurations that may be suitable for use with aspects of the present disclosure include, but are not limited to, personal computers, server computers, hand-held or laptop devices, multiprocessor systems, microprocessor-based systems, set-top boxes, programmable consumer electronics, mobile telephones, network PCs, minicomputers, mainframe computers, distributed computing environments that include any of the above systems or devices, and the like.

The order of execution or performance of the operations in embodiments of the aspects of the present disclosure illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the present disclosure.

When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates the aspects of the present disclosure by way of example and not by way of limitation. This description enables one skilled in the art to make and use the aspects of the invention, and describes several embodiments, adaptations, variations, alternatives, and uses of the aspects of the invention, including what is presently believed to be the best mode of carrying out the aspects of the invention. Additionally, it is to be understood that the aspects of the invention are not limited in their application to the details of construction and the arrangement of components set forth in the following description or illustrated in the drawings. The aspects of the invention are capable of other embodiments and of being practiced or carried out in various ways. Also, it will be understood that the phraseology and terminology used herein are for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and processes without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

In view of the above, it will be seen that several advantages of the aspects of the invention are achieved, and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A load cell system for a pumpjack, the pumpjack comprising a horsehead and a rod string, the rod string having a proximal end portion connected to the horsehead and a distal end portion in operative relationship with a well, the rod string comprising a bridle defining the proximal end portion of the rod string, the bridle including a bridle plate and first and second bridle cables extending in laterally spaced apart relationship along a length of the bridle from the horsehead to the bridle plate, the load cell system comprising:

a tension load cell fixed to the bridle at a first longitudinal location along the length of the bridle, the tension load cell having a first end portion connected to the first bridle cable and a second end portion connected to the second bridle cable, the tension load cell being configured to generate an output signal representative of a tension imparted on the tension load cell by the first and second bridle cables; and a strut fixed to the bridle at a second longitudinal location along the length of the bridle, the second longitudinal location being spaced apart along the length of the bridle between the first longitudinal location and the horsehead, the strut having a laterally extending width, the strut being connected to the first bridle cable at a first lateral location along the width and being connected to the second bridle cable at a second lateral location along the width, the first and second lateral locations being spaced apart from one another by a lateral spacing distance, the strut being configured to support the first and second bridle cables so that the first and second bridle cables at the second longitudinal location remain laterally spaced apart from one another by the lateral spacing distance during operation of the pumpjack.

2. The load cell system as set forth in claim 1, wherein the strut comprises a strut member extending along the width and first and second cable clamps secured to the strut member at the first and second lateral locations along the width.

3. The load cell system as set forth in claim 2, wherein the first and second cable clamps are releasably securable to the strut member at a plurality of spaced apart locations along the width of the strut to adjust the lateral spacing distance.

4. The load cell system as set forth in claim 2, wherein each of the first and second cable clamps comprises a threaded U bolt.

5. The load cell system as set forth in claim 2, wherein the strut member comprises a length of one of bar stock and tube stock.

6. The load cell system as set forth in claim 1, wherein end portions of the first and second bridle cables are fixed to the horsehead at respective locations that are spaced apart by a horsehead cable spacing distance and wherein the lateral spacing distance of the strut is approximately the same as the horsehead cable spacing distance.

7. The load cell system as set forth in claim 1, wherein the horsehead has width and the lateral spacing distance is in an inclusive range of from about 90% to about 100% of the width of the horsehead.

8. The load cell system as set forth in claim 1, wherein the tension load cell is connected to the first and second bridle cables such that a tensioned lateral distance between the first and second bridle cables at the first longitudinal location is less than the lateral spacing distance of the strut.

9. The load cell system as set forth in claim 1, further comprising a measurement processor operatively connected to the tension load cell to receive the output signal and configured to determine a rod load based thereon.

10. The load cell system as set forth in claim 1, wherein the tension load cell comprises an S-type tension load cell.

11. The load cell system as set forth in claim 10, wherein the S-type tension load cell comprises first and second cell end portions and the load cell system further comprises a first link extending from the first cell end portion to the first bridle cable and a second link extending from the second cell end portion to the second bridle cable.

12. The load cell system as set forth in claim 11, wherein at least one of the first and second links comprises a tensioner configured to adjust a tensioned lateral distance between the first and second bridle cables at the first longitudinal location.

13. The load cell system as set forth in claim 11, further comprising a first cable clamp connecting the first link to the first bridle cable and a second cable clamp connecting the second link to the second bridle cable.

14. A load cell system for measuring rod load in a pumpjack, the load cell system comprising:
 a tension load cell operatively coupled to a bridle between first and second bridle cables thereof at a location longitudinally spaced between a horsehead and a bridle plate of the pumpjack;
 wherein the bridle plate is coupled to the first bridle cable at a first connection point;
 wherein the tension load cell is coupled to the first bridle cable at a second connection point longitudinally spaced between the bridle plate and the horsehead;
 wherein the load cell system defines a third connection point with the first bridle cable, the third connection point being longitudinally spaced between the second connection point and the horsehead;
 wherein the load cell system is configured to maintain substantially constant longitudinal distances between the second connection point and each of the first and third connection points during operation of the horsehead; and
 wherein the load cell system is further configured to maintain a substantially constant lateral distance between the first and second bridle cables at the third connection point during operation of the horsehead.

15. The load cell system as set forth in claim 14, further comprising a strut member extending between the first and second bridle cables at the third connection point and defining the lateral distance between the first and second bridle cables at the third connection point.

16. The load cell system as set forth in claim 15, further comprising a first cable clamp securing the strut member to the first bridle cable and a second cable clamp securing the strut member to the second bridle cable, the first and second cable clamps being releasably securable to the strut member at a plurality of spaced apart locations along the width of the strut to adjust the lateral distance between the first and second bridle cables.

17. The load cell system as set forth in claim 14, wherein end portions of the first and second bridle cables are fixed to the horsehead at respective locations that are spaced apart by a horsehead cable spacing distance and wherein the lateral distance between the first and second bridle cables at the third connection point is approximately the same as the horsehead cable spacing distance.

18. The load cell system as set forth in claim 14, wherein the tension load cell is connected to the first and second bridle cables such that a tensioned lateral distance between the first and second bridle cables at the second connection point is less than the lateral distance between the first and second bridle cables at the third connection point.

19. A method of installing a load cell on a pumpjack, the method comprising:
 operatively connecting a tension load cell to first and second bridle cables of a bridle of the pumpjack; and
 connecting a strut to the first and second bridle cables;
 wherein the tension load cell and the strut are located along a length of the bridle so that the strut is longitudinally spaced between the tension load cell and a horsehead of the pumpjack when the method is complete.

20. A method as set forth in claim 19, wherein a rod clamp supporting a polished rod of the pumpjack on the bridle remains affixed to the polished rod during the step of operatively connecting the tension load cell to the first and second bridle cables.

* * * * *